United States Patent
Buckley et al.

(10) Patent No.: US 8,039,799 B2
(45) Date of Patent: *Oct. 18, 2011

(54) MOTION DETECTION SYSTEM AND METHOD

(75) Inventors: Mark C. Buckley, Pollock Pines, CA (US); David E. Merritt, Rocklin, CA (US)

(73) Assignee: Honeywell International Inc., Morristown, NJ (US)

( * ) Notice: Subject to any disclaimer, the term of this patent is extended or adjusted under 35 U.S.C. 154(b) by 698 days.

This patent is subject to a terminal disclaimer.

(21) Appl. No.: 12/118,261

(22) Filed: May 9, 2008

(65) Prior Publication Data

US 2011/0057105 A1    Mar. 10, 2011

Related U.S. Application Data

(63) Continuation-in-part of application No. 11/967,770, filed on Dec. 31, 2007, now abandoned.

(51) Int. Cl.
  *G01J 5/00* (2006.01)
(52) U.S. Cl. ................................... 250/338.3
(58) Field of Classification Search .................. 250/330, 250/331, 332, 333, 334, 338.1–338.4, 339.01–339.15, 250/341.1–341.8
See application file for complete search history.

(56) References Cited

U.S. PATENT DOCUMENTS

| | | | |
|---|---|---|---|
| 4,206,451 A * | 6/1980 | Kurschner | 340/522 |
| 4,663,521 A | 5/1987 | Maile | |
| 5,386,210 A | 1/1995 | Lee | |
| 6,188,318 B1 * | 2/2001 | Katz et al. | 340/545.3 |
| 7,161,152 B2 | 1/2007 | DiPoala | |
| 2005/0127298 A1 * | 6/2005 | DiPoala | 250/342 |
| 2005/0231353 A1 * | 10/2005 | DiPoala et al. | 340/522 |

FOREIGN PATENT DOCUMENTS

EP          1544823 A2      6/2005

* cited by examiner

*Primary Examiner* — Kiho Kim
(74) *Attorney, Agent, or Firm* — Husch Blackwell

(57) ABSTRACT

A system and method for detecting the presence of a moving object within a detection zone is provided. The system includes a first sensor responsive to light in a first range of wavelengths in the detection zone, a second sensor responsive to light in a second range of wavelengths in the detection zone, wherein the second range of wavelengths is different from the first range of wavelengths, and a processing component for generating a variable threshold value for the first sensor based upon at least maximum and minimum output signals from the second sensor within a predetermined period of time, and for comparing the first output signal with the variable threshold value. The processing component generates an activating signal if the first output signal exceeds the threshold value.

17 Claims, 8 Drawing Sheets

MOTION DETECTION SYSTEM AND METHOD

RELATED APPLICATION

This application is a continuation-in-part of prior U.S. patent application Ser. No. 11/967,770, filed Dec. 31, 2007, the entirety of which is incorporated herein by reference.

BACKGROUND OF THE INVENTION

1. Field of the Invention

The present invention generally relates to sensors and security system. More particularly, this invention relates to a motions detection system and method for detecting the presence of an intruder by utilizing passive infrared (PIR) motion sensors, which is capable of reducing false alarm due to white light in the security system.

2. Related Art

PIR motion sensors are popularly used as automatic light switches, alarm sensors or to control other electrical appliances. For example, the sensors detect the infrared light emanating from an intruder, such as a human or motor vehicle, and transmit a signal to activate an alarm. The PIR sensors, which are designed to be sensitive to the IR energy produced by the human body temperature range, include a light filter that passes energy between 7 micrometers and 14 micrometers while blocking the remainder. Thus, light in the visible spectrum is either reflected or absorbed by the filter. The energy that is absorbed by the filter causes heating of the filter. This heat is reradiated and is detected by the pyroelectric sensing elements of the sensors.

It is possible therefore for visible light to be converted into IR energy, thereby causing the sensors to issue a false alarm. Thus, PIR motion sensors are inherently susceptible to detecting stimuli not associated with the intruders. Specifically, passive PIR motion sensors are susceptible to the energy produced by automobile headlights and other light resources emanating from outside the region being monitored by the sensors. The energy produced by automobile headlights within a certain distance from the sensors can be sufficient to cause a false alarm issued from the sensors. False alarms in a security system having intrusion detection sensors are a significant distraction to the police force and can be very costly in fines to the owners of the security system.

Traditional approaches to solving this issue include augmenting the out of band energy blocking ability of the pyroelectric detector window/filter with either: 1) adding pigmentation to the lens intended to block "white light" while passing infrared energy (for example, Zinc Sulfide) or 2) the addition of a secondary optical filter. Both approaches have their drawbacks and neither approach satisfies the desire for significantly improved, if not unlimited white light immunity.

U.S. Pat. No. 7,161,152 to DiPoala describes a method and system that provides the potential for unlimited white light immunity, in which a secondary light sensor is utilized to detect when lighting conditions on the motion detector change. If the change in light intensity exceeds a predetermined threshold for this light sensor, the DiPoala system prohibits any potential alarm signal from being generated within a predetermined time period of this change. More specifically, in order to generate an alarm signal, the PIR sensor signal shall exceed a first predetermined threshold for the PIR sensor and, simultaneously, the visible light sensor signal shall not exceed a second predetermined threshold for the light sensor. In other words, the system suppresses sending out an alarm signal if the intensity of the visible light exceeds a predetermined threshold.

Due to foregoing reasons, the DiPoala system does present a potential problem that it is possible for an intelligent intruder to "blind" the motion detector by briefly sweeping a flashlight across the motion detector to shine light upon the detector while he traverses the protected area, thereby suppressing the generating of an alarm signal.

Therefore, it would be very advantageous to provide a motion detecting method and system that provides significantly improved, if not unlimited white light immunity as well as obviates intentional blinding of the sensor by an intruder.

SUMMARY OF THE INVENTION

In view of the foregoing and other problems, the present invention provides a motion detection system for detecting the presence of a moving object within a detection zone. A first sensor responsive to light in a first range of wavelengths in the detection zone is provided to generate a first output signal indicative of a first detected parameter of the light in the first range. A second sensor responsive to light in a second range of wavelengths in the detection zone is provided to generate a second output signal indicative of a second detected parameter of the light in the second range. The second range of wavelengths is different from the first range of wavelengths and the second sensor may be disposed approximately to the first sensor. A processing component is provided to generate a variable threshold value for the first sensor based upon the second output signal indicative of a second detected parameter of the light in the second range and compare the first output signal with the variable threshold value. The processing component further generates an activating signal if the first output signal exceeds the threshold value.

The present invention further provides a method of detecting the presence of a moving object within a detection zone. The method includes the following steps: sensing light in a first range of wavelengths at a first position in the detection zone and generating a first output signal indicative of a first detected parameter of the light in the first range; sensing light in a second range of wavelengths and generating a second output signal indicative of a second detected parameter of the light in the second range, wherein the second range of wavelengths is different from the first range of wavelengths; generating a variable threshold value based upon the second output signal indicative of a second detected parameter of the light in the second range; and comparing the first output signal with the variable threshold and generating an activating signal if the first output signal exceeds the threshold value.

Although a motion detection system and method will be described in connection with a security system, it should be recognized that the application of the system and method according to the present invention is not limited to a security system. Rather, the system and method is applicable to any other suitable circumstances, such as electrical appliances control, where detection of a moving object in a detection zone is required.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

The present invention now will be described in detail hereinafter with reference to the accompanying drawings, in which preferred embodiments of the invention are shown. However, this invention may be embodied in many different forms and should not be construed as limited to the embodiments set forth herein. Like numerals refer to like elements throughout.

Figure 1:
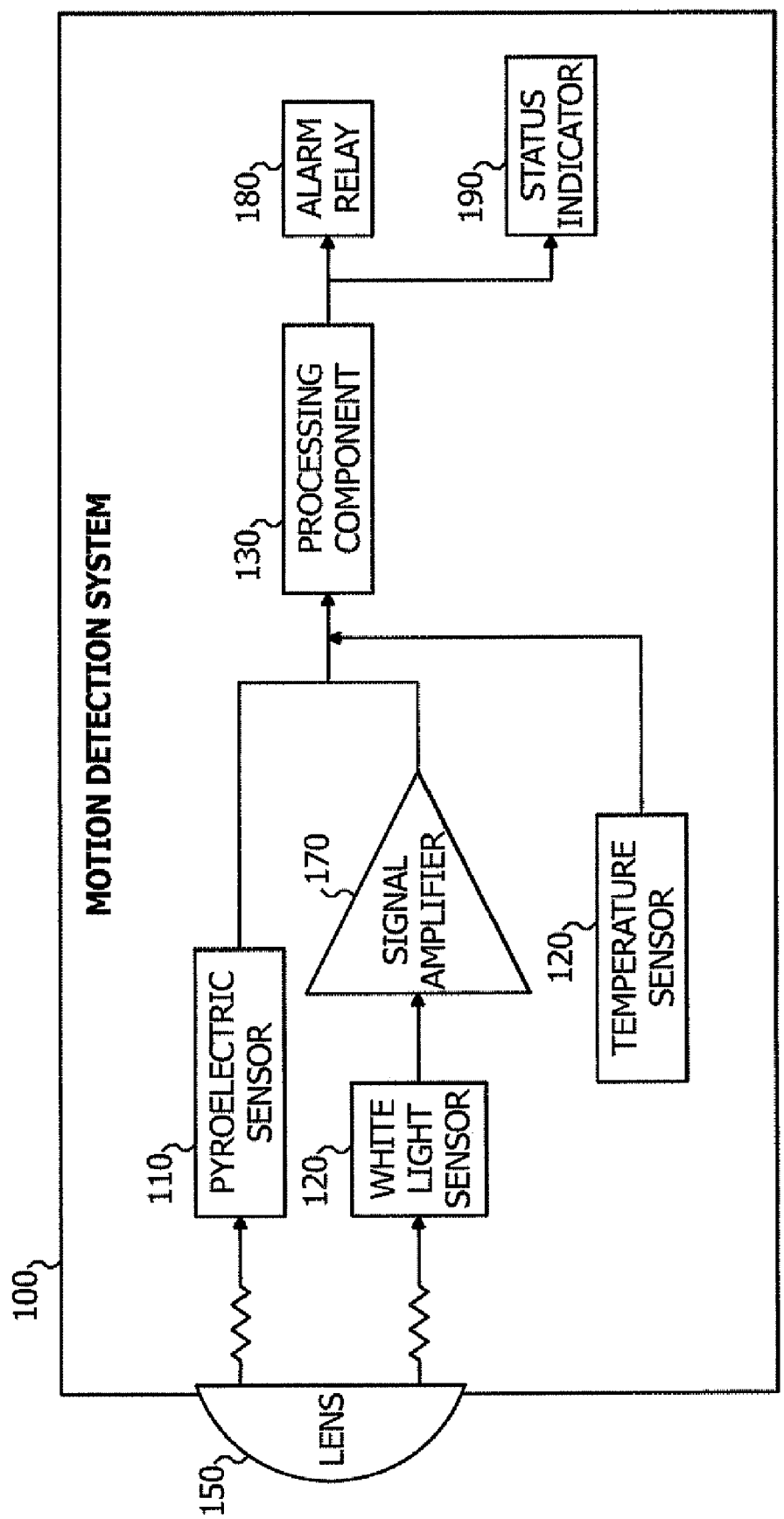
FIG. 1 is a block diagram of a motion detection system for detecting a presence of a moving object in a detection zone according to one exemplary embodiment of the present invention.

FIG. 1 illustrates a block diagram of a motion detection system 100 according to one exemplary embodiment of the present invention. Generally, the motion detection system 100 includes a pyroelectric sensor 110, a white light sensor 120, a processing component 130, a temperature sensor 140, a lens or mirror 150, a signal amplifier 170, an alarm relay 180 and a status indicator 190.

The lens 150, for example, a Fresnel lens array or mirror array, is disposed in front of the pyroelectric sensor 110 and the white light sensor 120 to focus and transmit the light energy onto the sensors. For example, a Fresnel lens array can be molded and mounted externally in the housing (not shown) of the detection system 100 to implement the lens 150. The lens 150 can inhibit the passage of light having predetermined wavelengths, and thereby can function as a filtering element. The lens 150 can be multi-faceted in order to provide a plurality of detection zones, which can be fanned out in a vertical orientation as well as horizontal orientation to maximize the coverage of the detection system.

The pyroelectric sensor 110 is responsive to infrared light radiating from objects in a detection zone. The pyroelectric sensor 110 converts the infrared light into electrical signals. For example, the pyroelectric sensor 110 generates a first output signal indicative of the change of the level of infrared light in a detection zone and sends the signal to the processing component 130. If the level of the infrared light in a certain detection zone suddenly increases causing the electrical signal to increase beyond a threshold level, it is determined that an intruder is present in the detection zone, and subsequently an alarm is issued.

The energy sensing elements in a pyroelectric sensor are sensitive to all wavelengths of light from the UV to the IR including the visible wavelengths. The pyroelectric sensor 110 is typically configured to be sensitive to infrared light having particular wavelengths. For example, the pyroelectric sensor 110 can be configured to be sensitive to light having a wavelength approximately between 7 micrometers and 14 micrometers. This is typically achieved by integrating a light filter that passes energy between 7 micrometers and 14 micrometers while blocking the remainder.

The white light sensor 120 is disposed approximately to the pyroelectric sensor 110 and is capable of monitoring visible light reaching both the pyroelectric sensor 110 and the white light sensor 120 passing through the lens 150. For example, the white light sensor 120 is provided in the same cavity within the housing as the pyroelectric sensor 110, such that to ensure the light intensity apparent to the pyroelectric sensor 110 is the same as that apparent to the white light sensor 120. The white light sensor 120 can be any suitable known sensors responsive to light in the visible spectrum, and, preferably, also in the near infrared spectrum. For example, the white light sensor 120 can be photodiode, phototransistor, photovoltaic cell or other suitable devices. The white light sensor 120 is provided to detect the emission of a potentially false alarm triggering light source, for example, a flashlight or automobile headlights, by monitoring only visible light or both visible light and near infrared light. Typically, visible light is light having a wavelength of between approximately 380 and 750 nm.

According to the exemplary embodiment of the present invention, the white light sensor 120 senses the incident visible light on the pyroelectric sensor 110 and generates a second output signal indicative of a detected parameter of the visible light reaching the pyroelectric sensor 110. For example, the detected parameter is the change or differentiation of the light intensity of the visible light reaching the pyroelectric sensor 110 within a predetermined time span, or the detected parameter is a realtime light intensity of the visible light and the different parameters according to different time sequences are fed to the processing component 130 to obtain the change or differentiation of the light intensity of the visible light reaching the pyroelectric sensor 110 within a predetermined time span. Typically, in the quiescent state, the pyroelectric sensor 110 will attain its baseline value regardless of the absolute value of the energy reaching the pyroelectric sensing elements of the pyroelectric sensor 110. When a change in energy occurs on the pyroelectric sensing elements, the pyroelectric signal will depart from the baseline value. When the energy change stabilizes or is removed, it may take from 3 to 10 seconds for the pyroelectric signal to return to the baseline value depending on amplifier circuit design, the pyroelectric design and light intensity. Thus, in this embodiment, the visible light sensor signal is monitored continually, and the change of light intensity of visible light reaching the pyroelectric sensor 110 will be obtained by subtracting the minimum signal from the white light sensor 120 within 5 seconds from the maximum signal from the white light sensor 120 within 5 seconds. The output signal from the white light sensor 120 is transmitted to the processing component 130 for generating a variable threshold value for the pyroelectric sensor 110, which will be described later.

Optionally, a signal amplifier 170 is coupled to the white light sensor 120 for amplifying the output signal generated by the white light sensor 120.

According to an exemplary embodiment of the present invention, a temperature sensor 140, for example, a thermistor, is provided to sense the ambient temperature of the detection system and generate a temperature signal. Optionally, the temperature signal is also transmitted to the processing component 130 for generating a variable threshold value for the pyroelectric sensor 110. In other words, both the output signal from the white light sensor 120 and the output signal from the temperature sensor 140 contribute to the generation of a variable threshold value for the pyroelectric sensor 110. Typically, excluding the contribution from the output signal generated by the white light sensor 120, a threshold value for the pyroelectric sensor 110 to activate an intruding alarm is a fixed value, when the temperature is below 70° F. The alarm threshold is reduced as the temperature is increased until a minimum threshold is achieved at a temperature near human body, such as 95° F. Then the threshold is increased as the temperature increases above this temperature. Preferably, the threshold values depending on the temperature are contained in a "look-up" table contained in the processing component 130.

The processing component 130 has two main functionalities, generating a variable threshold value for the pyroelectric sensor 110 based on the second output signal from the white light sensor 120 and, optionally, the temperature signal from the temperature sensor 140, and comparing the variable threshold value with the first output signal from the pyroelectric sensor 110. In addition, if it is determined that the first output signal from the pyroelectric sensor 110 exceeds the variable threshold value, the processing component 130 generates an activating signal and further transmits the signal to an alarm relay 180 and/or a status indicator 190 for indicating the operational status of the system. Upon receiving an activating signal, the alarm relay 180 changes from a normally closed state to an open state. An alarm panel of the detection system detects this open condition and takes measures, such as sounding an alarm, turning on one or more lights and/or notifying the police, for example.

It should be recognized that the processing component can be any computer-related entity as long as it is capable of executing the functionality thereof. For example, the component includes but not limited to hardware, software and a combination of hardware and software.

Figure 2:
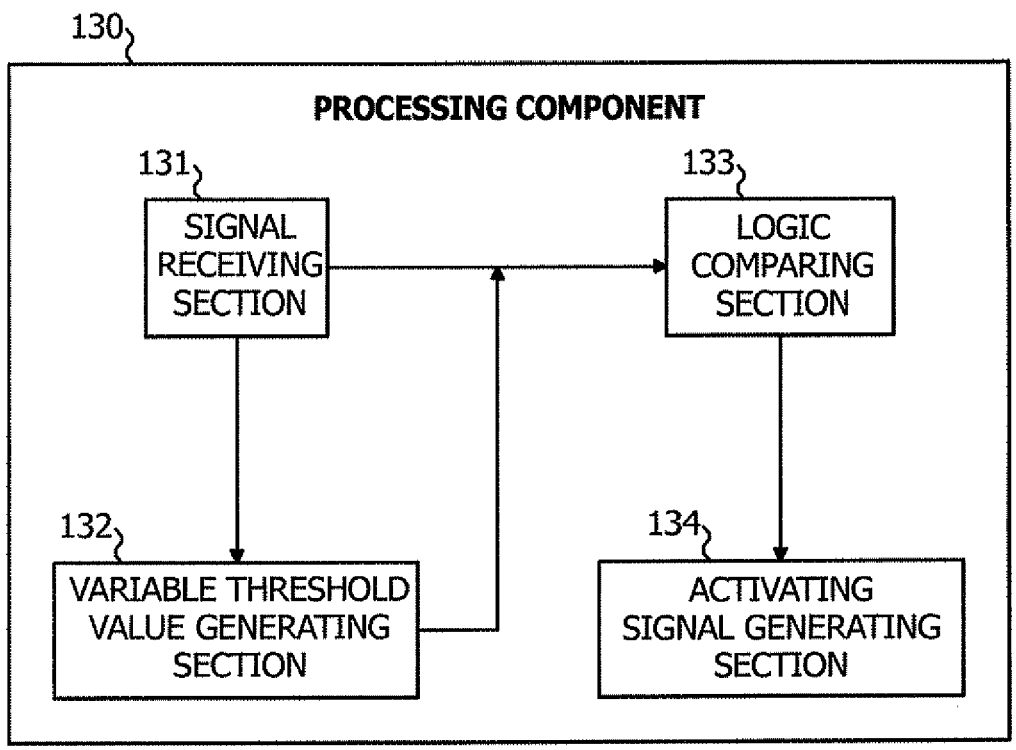
FIG. 2 is a block diagram of a processing component of a motion detection system according to one exemplary embodiment of the present invention.

FIG. 2 illustrates the block diagram of the processing component 130 according to one exemplary embodiment of the present invention. The processing component 130 includes a signal receiving section 131, a variable threshold value generating section 132, a logic comparing section 133 and an activating signal generating section 134. The signal receiving section 131 receives the first output signal from the pyroelectric sensor 110, the second output signal from the white light sensor 120 and, preferably, the temperature signal from the temperature sensor 140. The signal receiving section 131 further transmits the first output signal to the logic comparing section 133 and transmits the second output signal and the temperature signal to the variable threshold value generating section 132, which in turn generates a variable threshold value for the pyroelectric sensor 110 and transmits the value to the logic comparing section 133. Subsequently, the logic comparing section 133 compares the first output signal with the variable threshold value generated to determine whether the first output signal exceeds the current variable threshold value, and if the threshold is exceeded, it sends out an instruction to the activating signal generating section 134 for generating an activating signal and transmitting the activating signal to the alarm relay 180 and status indicator 190.

Figure 3:
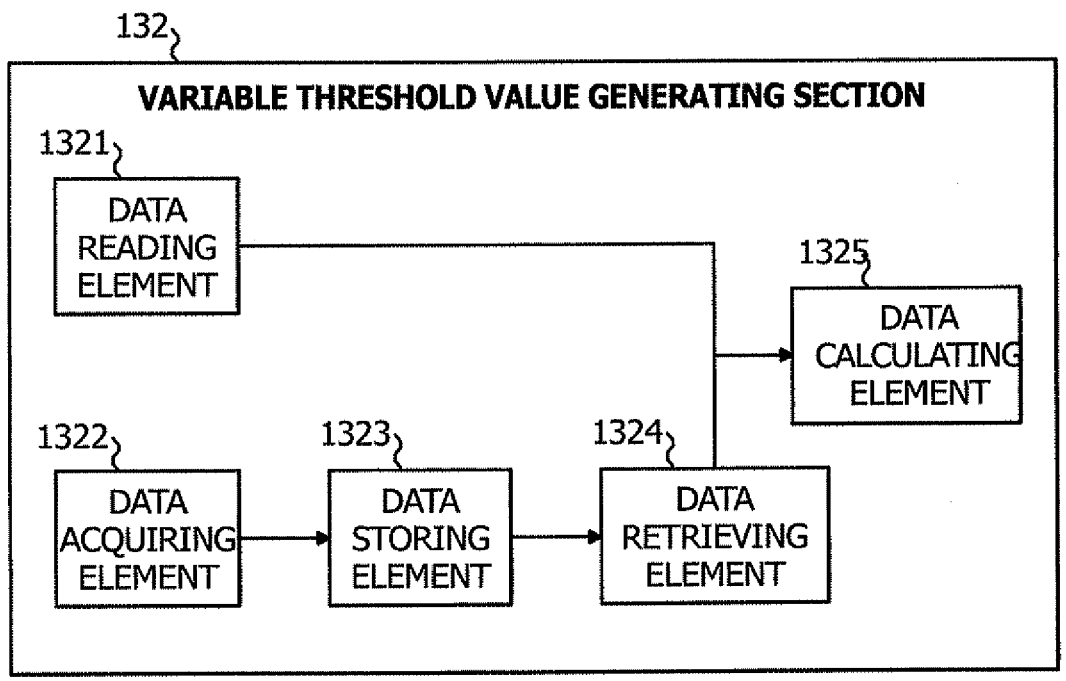
FIG. 3 is a block diagram of a variable threshold value generating section of the processing component of a motion detection system according to one exemplary embodiment of the present invention.

FIG. 3 illustrates the block diagram of the variable threshold value generating section 132 according to one exemplary embodiment of the present invention. For example, the variable threshold value generating section 132 includes a data reading element 1321, a data acquiring element 1322, a data storing element 1323, a data retrieving element 1324, and a data calculating element 1325.

Specifically, the data reading element 1321 reads out a threshold component from the above-mentioned "look-up" table, based on the temperature signal from the temperature sensor 140. The data acquiring element 1322 obtains realtime data information concerning the light intensity of visible light reaching the pyroelectric sensor 110, based on the second output signal generated by the white light sensor 120. The data information is further stored in the data storing element 1323 according to the time sequences of the second output signal. The data retrieving element 1324 retrieves the maximum and minimum values of the data within a predetermined time span, for example, 5 seconds. The retrieved maximum and minimum values of the data are transmitted to the data calculating element 1325 together with the data read out from the "look-up" table. The data calculating element 1325 generates a variable threshold value based on the differentiation of the light intensity of visible light reaching the pyroelectric sensor 110, by calculating the inputted maximum and minimum values indicative of the light intensity of visible light reaching the pyroelectric sensor 110 and the value indicative of the ambient temperature. The threshold value for the pyroelectric sensor 110 is a function of both the ambient temperature and the differentiation of lighting conditions as sensed by the white light sensor 120. In other words, the information regarding the changing rate of the light intensity of visible light is included to set an alarm threshold value for the pyroelectric sensor.

Preferably, the variable threshold value for the pyroelectric sensor 110 is generated based on the following Equation 1:

$$T = Tlookup + C1*[VSmax - VSmin] \qquad \text{Equation 1}$$

Where:
T=alarm threshold value for the pyroelectric sensor 110;
Tlookup=alarm threshold component read out from the temperature "look-up" table;
C1=a coefficient to be derived from the visible light sensor amplification circuit;

VSmax=maximum signal from visible light sensor 120 over last 5 seconds; and

VSmin=minimum signal from visible light sensor 120 over last 5 seconds.

Therefore, according to this embodiment, a small change in light intensity, for example, change caused by a hand held flash light, results in a small increase in the threshold value for the pyroelectric sensor; while a large change in light intensity, for example, change caused by automobile head light results in a large increase in the threshold value for the pyroelectric sensor. Accordingly, this embodiment is capable of issuing an alarm if an intruder attempts to "blind" the motion detector by illuminating it with a flashlight. As the alarm threshold will be slightly increased, the first output signal generated due to the intruder has a high probability of exceeding this new threshold value. Detailed description of the variable thresholds will be made with reference to FIGS. 6-11.

It should be recognized that the above sections and elements can be any computer-related entity as long as it is capable of executing the functionality thereof. For example, the sections and elements include but are not limited to hardware, software and a combination of hardware and software.

Figure 4:
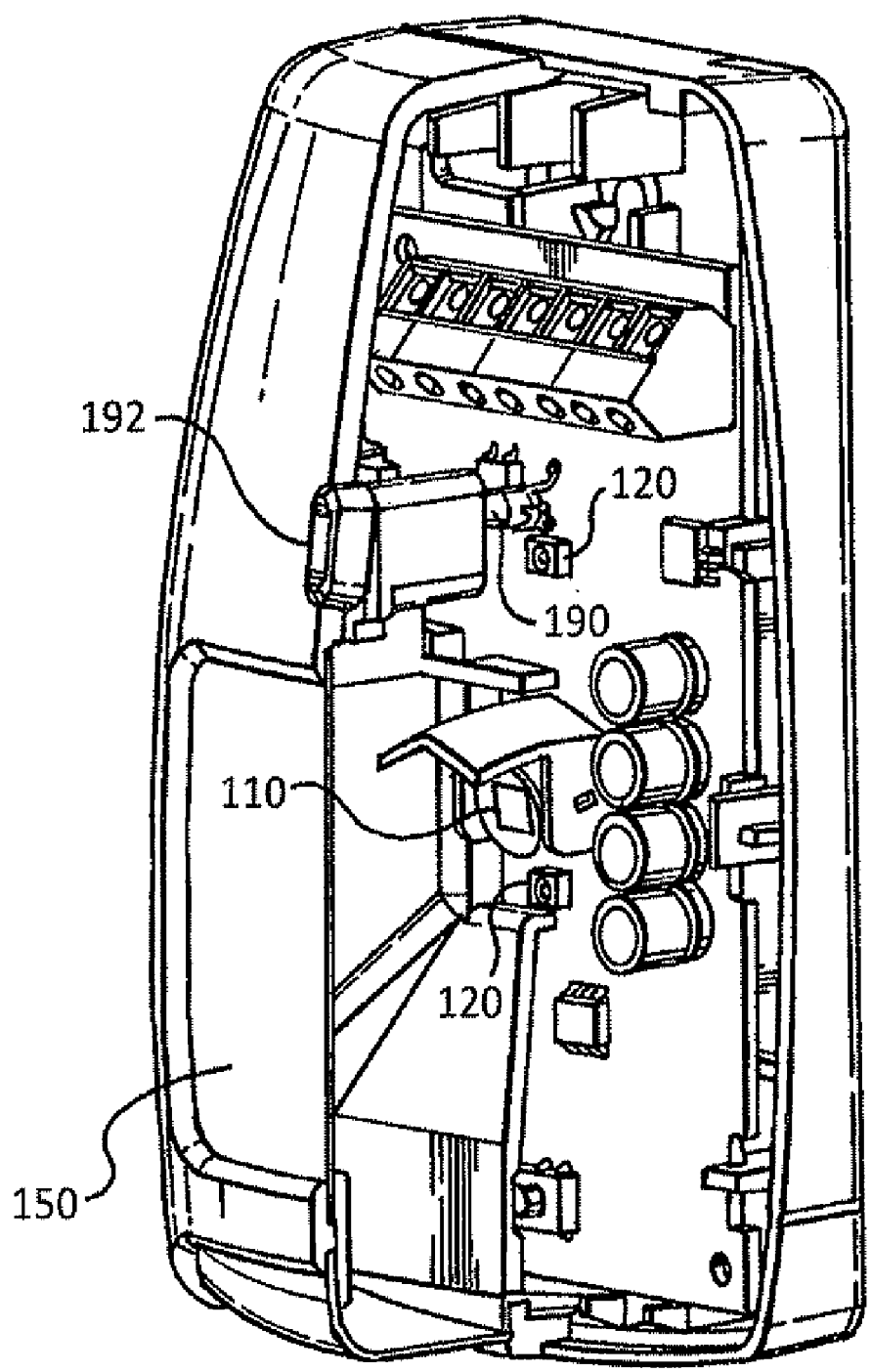
FIG. 4 is a perspective view of a motion detection system according to one exemplary embodiment of the present invention, illustrating the spatial relationship of a lens, a pyroelectric sensor and a white light sensor of the motion detection system and possible locations for the white light sensor.

FIG. 4 is an exemplary perspective view of the motion detection system 100, illustrating the spatial relationship of the lens 150, the pyroelectric sensor 110 and the white light sensor 120, and possible locations of the white light sensor 120. As shown in the exemplary embodiment, the white light sensor 120 can be disposed very close to the pyroelectric sensor 110. Alternatively, the white light sensor 120 can be disposed under a light pipe 192 of the status indicator 190. Although a detecting system can function properly with a white light sensor positioned under the light pipe 192 of the status indicator 190, the off-axis uniformity of the light reaching the white light sensor 120 may differ from the off-axis uniformity of the light reaching the pyroelectric sensor 110. Thus, in order to ensure that the pyroelectric sensor 110 and the white light sensor 120 are seeing very nearly the same amount of white light, it is preferred to position the white light sensor 120 in very close proximity to the pyroelectric sensor 110. However, according to the present invention, locations of the white light detector 120 are not limited to the above-mentioned locations. A person of ordinary skill in the art should understand that any suitable location of the white light sensor 120 within or on the motion detection system 100 is within the scope of the present invention as long as the motion detection system 100 functions properly.

Figure 5:
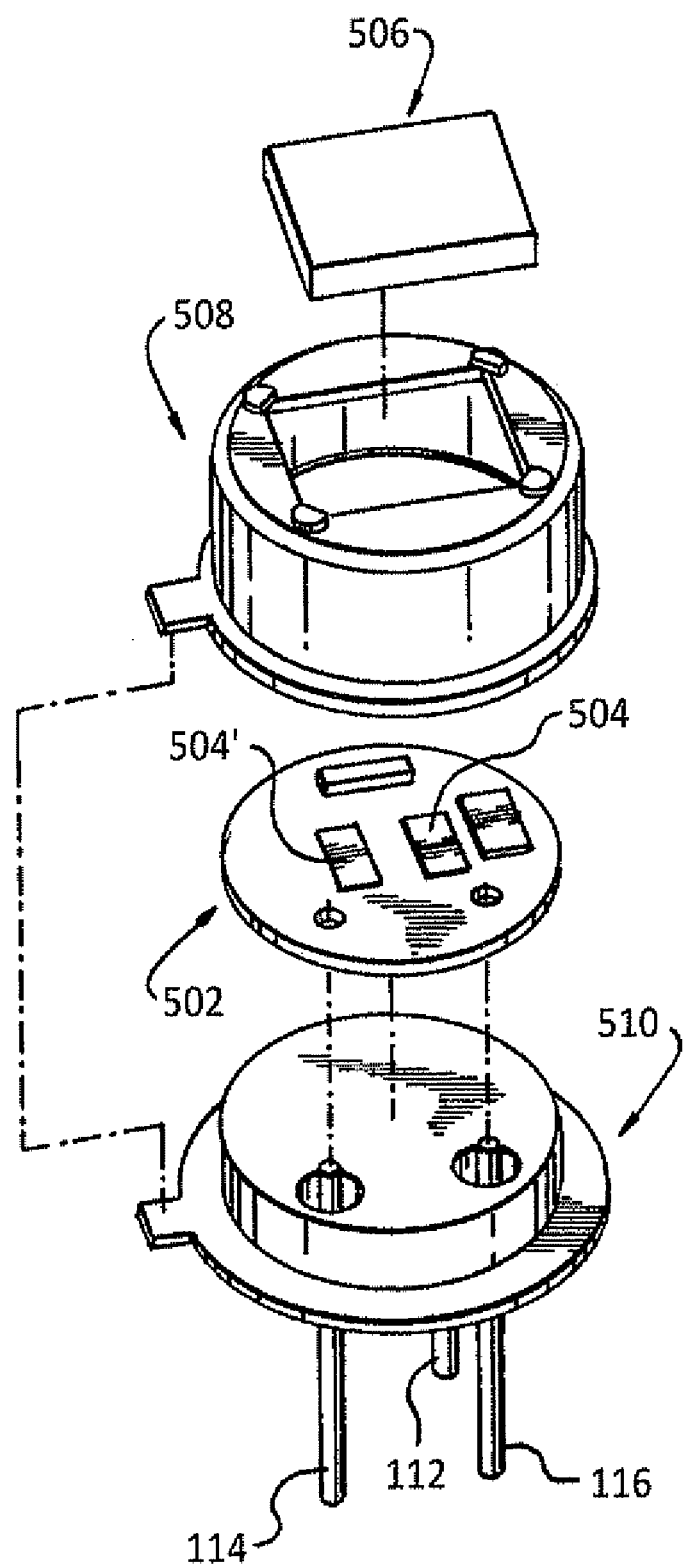
FIG. 5 is an exploded view of a pyroelectric sensor of a motion detection system according to one exemplary embodiment of the present invention.

FIG. 5 is an exploded view illustrating an exemplary structure of the pyroelectric sensor 110 of the motion detection system 100. An internal printed circuit board 502 contains two pyroelectric sensing elements 504 and 504', one of which is a positive element and the other of which is a negative element. The pyroelectric sensing elements are 2 mm tall by 1 mm wide and spaced by 1 mm. An optical filter 506 is bonded to a housing cover 508. For example, the optical filter 506 passes energy in the wavelength range of 5 to 15 μM and blocks energy below 5 μM.

Filters used on pyroelectric sensing elements are usually made of Silicon which absorbs energy below 1.1 μM. Many thin layers of Germanium and Zinc Sulfide are placed on the Silicon to increase the blocking range up to 5 μM. When energy absorbed by the filter turns to heat which passes through the filter and is detectable by the pyroelectric sensing elements, a false alarm may be issued. When the internal printed circuit board 502 is installed on the housing base 510, the housing cover 508 containing the optical filter 506 is hermetically sealed to the housing base 510. For example, the pyroelectric sensor 110 may contains three leads. One is a ground lead 112, another is a power lead 114 for bringing external power into the pyroelectric sensor 110 and the other lead 116 is to route the pyroelectric signal out of the sensor 110.

Figure 6:
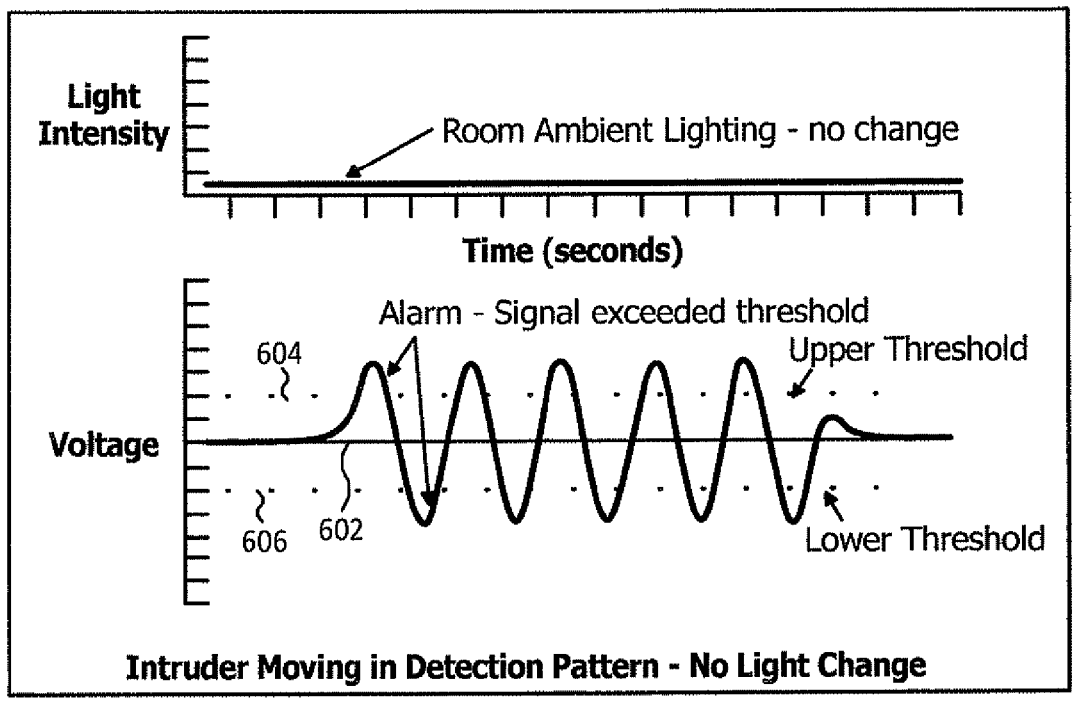
FIG. 6 is a diagram illustrating a pyroelectric response signal generated by a pyroelectric sensor of a motion detection system according to one exemplary embodiment of the present invention, as an intruder traverses the detection zones in a detected region of the system.

FIG. 6 is a diagram illustrating an example of an amplified electrical output from the pyroelectric sensor 110 when a human crosses the detection zones in the protected region, with the upper graph illustrating intensity of the light reaching the pyroelectric sensor 110 and the lower graph illustrating a pyroelectric response signal from the pyroelectric sensor 110.

The lens 150 contains a plurality of individual lens elements positioned spatially from one another. The energy from the human reaching one of these lens elements is focused on one of the pyroelectric elements 504, which for example is a positive element. As the human moves, this energy is swept across this positive element 504 causing a positive electrical response. As the human continues to move, this energy is then swept across the negative element 504' causing a negative response. As the human continues to move, the next lens element in the array begins to sweep the energy across the positive element, and then the negative element. Each lens element will generate a positive signal and subsequently a negative signal. By means of the multiple lens elements, a pyroelectric response signal 602 shown in the lower graph of FIG. 6 is in the form of a sinusoidal waveform repeating itself. In case the positive portion of the signal 602 exceeds an upper threshold 604 or the negative portion of the signal 602 exceeds a lower threshold 606, an alarm is issued. The upper graph shows that the light reaching the sensor has remained constant while the human was present.

Figure 7:
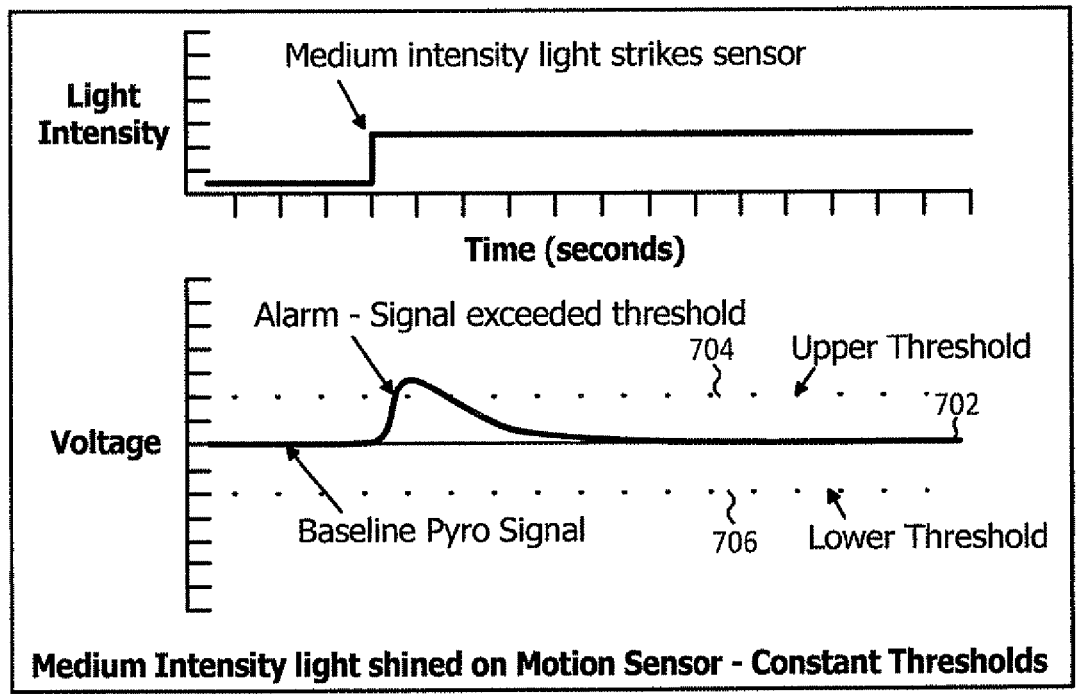
FIG. 7 is a diagram illustrating a pyroelectric response signal generated by a pyroelectric sensor of a motion detection system according to one exemplary embodiment of the present invention, in response to a step change in light intensity applied to the motion detection system.

FIG. 7 is a diagram illustrating the response of the pyroelectric sensor 110 when a medium intensity light reaches the pyroelectric sensor 110, such as car headlights shined through the facility windows, with the upper graph illustrating a step change of the intensity of the light reaching the pyroelectric sensor 110 and the lower graph illustrating an upper threshold 704, a lower threshold 706 and a pyroelectric response signal 702 from the pyroelectric sensor 110. The upper graph shows the increase in light intensity measured by the white light sensor 120. The lower graph shows the pyroelectric signal in response to this light of medium intensity. In this figure, the pyroelectric signal that resulted from the medium intensity light exceeds the upper threshold 704 and an alarm is issued.

Figure 8:
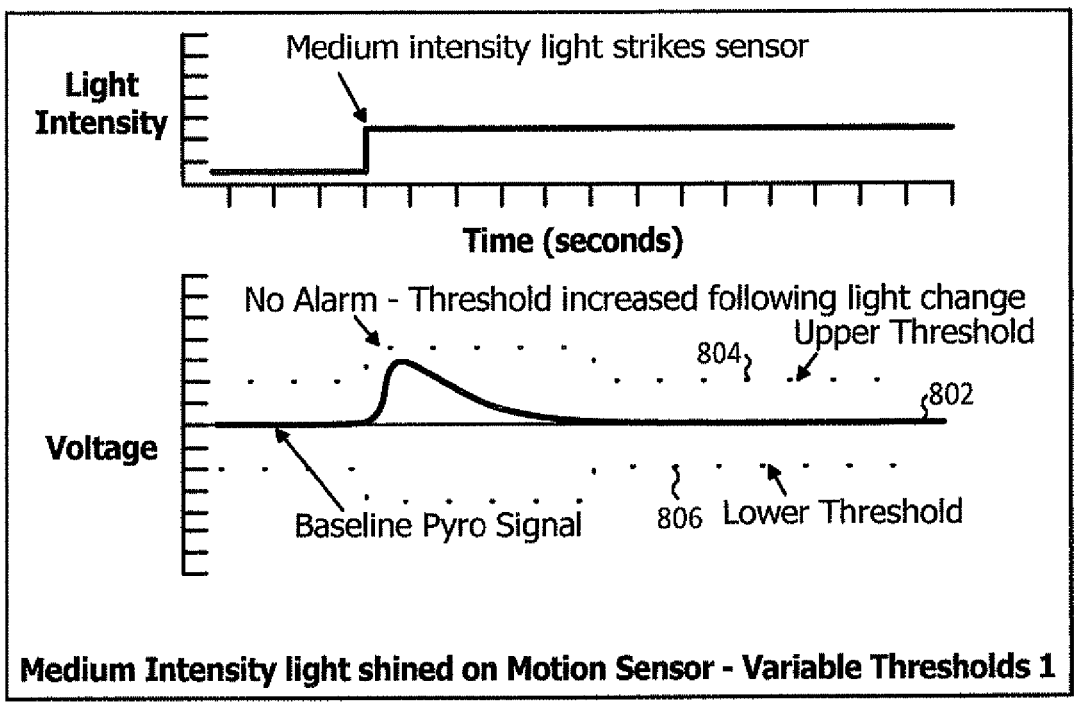
FIG. 8 is a diagram illustrating thresholds varied in response to a detection of a change in light intensity applied to the motion detector and a pyroelectric response signal in response to the change, wherein light of medium intensity reaches sensors of the detection system.

FIG. 8 is a diagram illustrating the situation where light of medium intensity shined on the detection system and the variable thresholds are generated to void issuing false alarm. The upper graph illustrates a step change of the intensity of the light reaching the pyroelectric sensor 110. The lower graph illustrates a pyroelectric signal 802 from the pyroelectric sensor 110 responsive to the light, and a variable upper threshold 804 and a variable lower threshold 806 that follow the step change of the light intensity in order to avoid issuing false alarm. The light intensity graph is the same as the light intensity graph of FIG. 7. The pyroelectric response signal 802 of FIG. 8 is also the same as the pyroelectric response signal 702 of FIG. 7.

The upper threshold 804 and the lower threshold 806 for determining issuing alarms are temporarily increased from a baseline portion of the thresholds to ensure that the pyroelectric response signal 802 resulted from the increased light level would not exceed the thresholds, thereby issuing no alarm. The thresholds 804 and 806 are increased just enough to ensure that the pyroelectric response signal 802 would not exceed it, but not so much as to ignore an intruder entering the pattern at the same time that he is trying to defeat the detector by shining a powerful flashlight at it.

Figure 9:
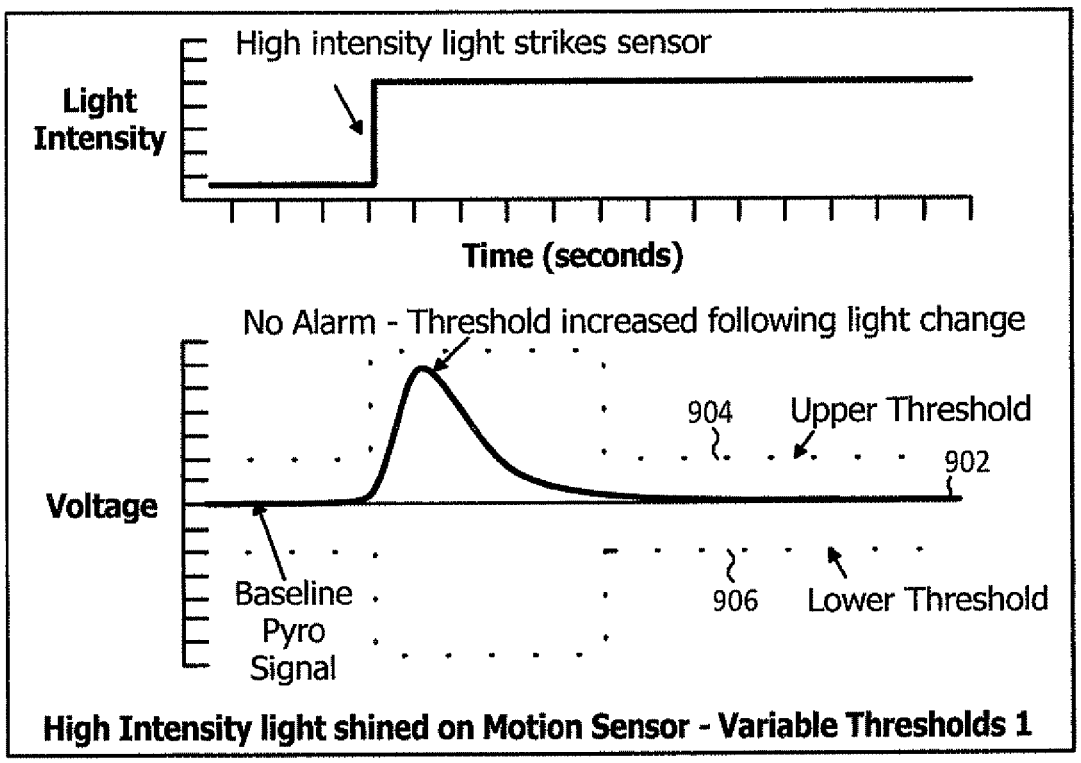
FIG. 9 is a diagram similar to FIG. 8 illustrating thresholds varied in response to a detection of a change in light intensity applied to the motion detector and a pyroelectric response signal in response to the change, wherein light of high intensity reaches sensors of the detection system.

FIG. 9 is a diagram illustrating the situation where light of high intensity is shined on the detection system and the variable thresholds are generated to void issuing false alarm. In this embodiment, the light intensity striking the motion detection system 100 is significantly higher than the light intensity shown in FIGS. 7 and 8. The upper graph illustrates a step change of the intensity of the light reaching the pyroelectric sensor 110. Accordingly, the step change is higher that that in FIG. 8. The lower graph illustrates a pyroelectric signal 902 from the pyroelectric sensor 110 responsive to the light, and a variable upper threshold 904 and a variable lower threshold 906 for preventing issuing false alarm. In this embodiment, the upper threshold 904 and the lower threshold 906 are increased temporarily from a baseline threshold to a much higher level in response to the higher light intensity detected. In this way, the stepped portion of the thresholds follow the step change of light intensity, to ensure that no false alarm due to the visible light intensity would be issued.

Figure 10:
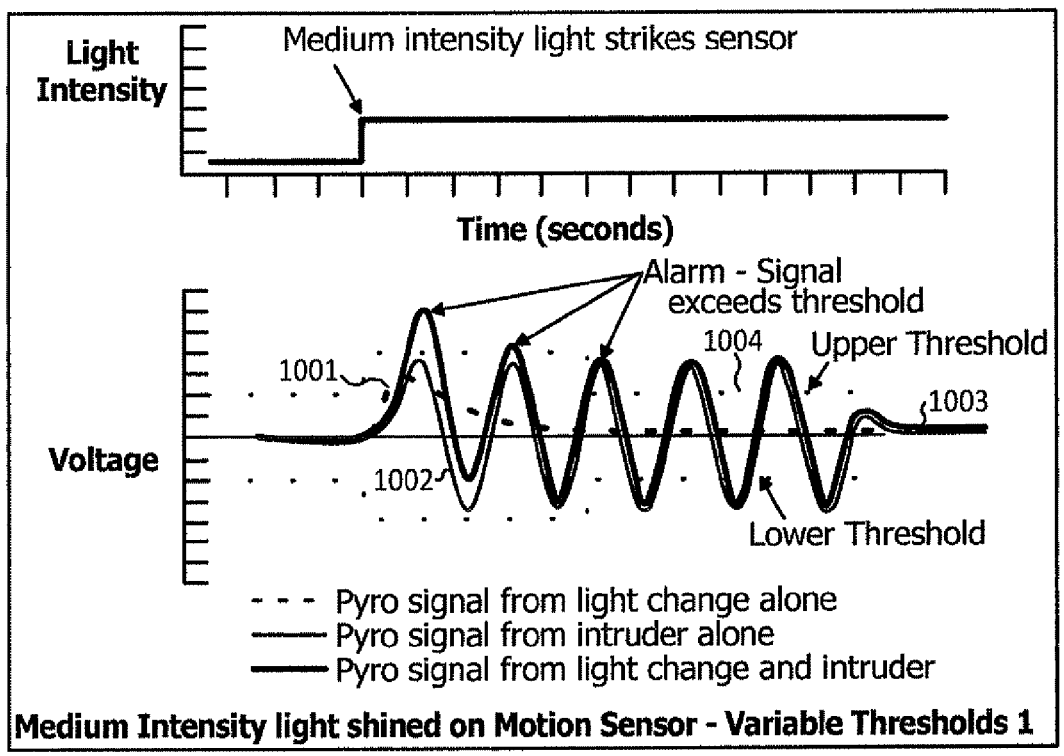
FIG. 10 is a diagram illustrating a composite pyroelectric response signal resulted from a pyroelectric response signal responsive to light of medium intensity applied to the motion detections system and a pyroelectric response signal responsive to an intruder under the circumstance where the intruder attempts to traverse the protected area while the motion detection system is illuminated in an attempt to blind it.

FIG. 10 is a diagram illustrating the situation where light of medium intensity is shined on the detection system and a potential intruder enters the detection regions of the detection system. The upper graph illustrates a medium intensity of the light reaching the pyroelectric sensor 110, similar to that of FIGS. 7 and 8. The lower graph illustrates a composite response signal 1003 from the pyroelectric sensor 110 when the light of medium intensity strikes the motion detection system 100 and the human enters the protected regions of the detection system 100, for example, within 1 second afterward.

An upper threshold 1004 and a lower threshold 1006 are the same as the upper threshold 804 and lower threshold 806 in FIG. 8. The dotted line in FIG. 10 indicates a pyroelectric response signal 1001 responsive to the light change alone. The thin line in FIG. 10 indicates a pyroelectric signal 1002 responsive to the human entering the protected regions alone. The thick line in FIG. 10 indicates the composite pyroelectric signal 1003 responsive to both the light and the human, which is a sum of the individual signals 1001 and 1002. The thresholds 1004 and 1006 are temporarily changed based on the light intensity change sensed, similar to that of FIG. 8. In effect, the pyroelectric signal 1002 responsive to the existence of a human in the detected regions rides on top of the pyroelectric signal 1001 due to white light. As shown in FIG. 10, the composite pyroelectric signal 1003 resulted from these signals exceeds the temporarily increased thresholds 1004, and accordingly an alarm is generated to indicate an intrusion. Thus, the potential intruder's attempt to blind the detection system 100 is defeated.

Figure 11:
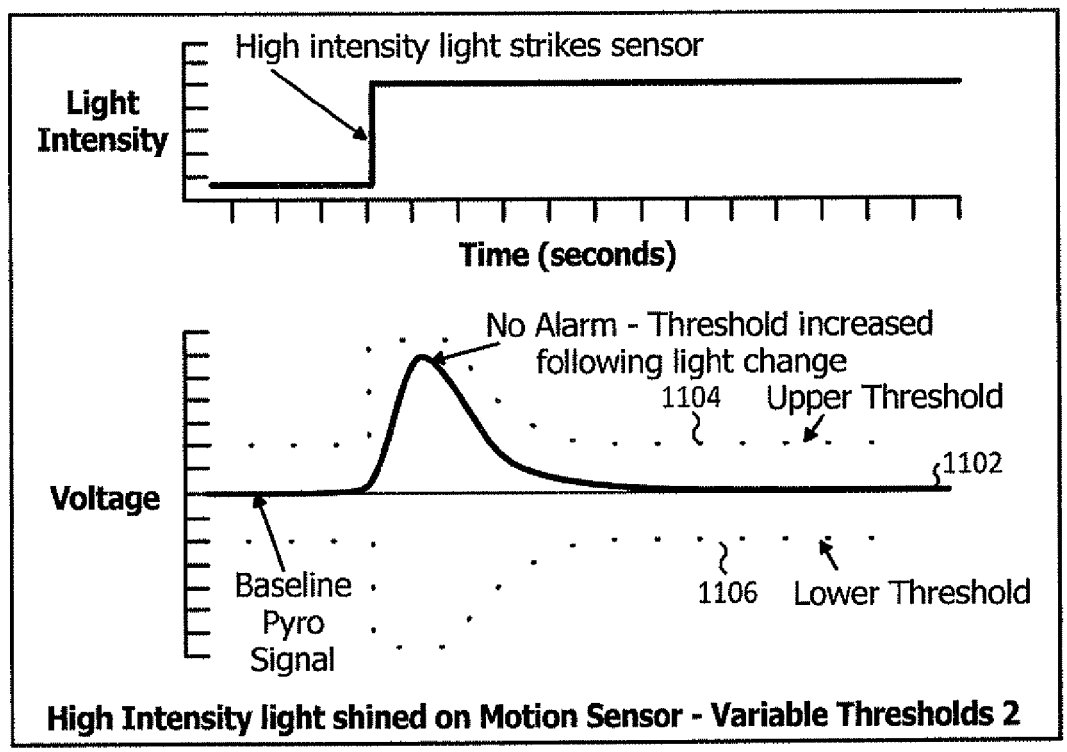
FIG. 11 is a diagram illustrating an alternate form of variable thresholds in response to a change in light intensity, wherein the threshold does not remain high for a full preset duration but begins to decay back down to a baseline threshold after a short period of time.

FIG. 11 is a diagram illustrating an alternative form of the variable thresholds according to an exemplary embodiment of the present invention. The upper graph illustrates a light of high intensity light reaching the pyroelectric sensor 110. The lower graph illustrates a response signal 1102 from the pyroelectric sensor 110, and an alternative form of the variable thresholds. In this embodiment, the pyroelectric response signal 1102 is same as the signal 902 in FIG. 9. Variable thresholds 1104 and 1106 in FIG. 11 are also set to increase temporarily from a baseline threshold portion in response to the light intensity change detected by the white light sensor 120. However, the thresholds 1104 and 1106 are held at the higher value for a shorter period of time and afterwards the thresholds 1104 and 1106 are allowed to decay back to the baseline threshold portion in a curve similar to that exhibited by the pyroelectric response signal 1102. Therefore, it is easier to detect an intruder signal riding on top of the light change induced pyroelectric signal.

Figure 12:
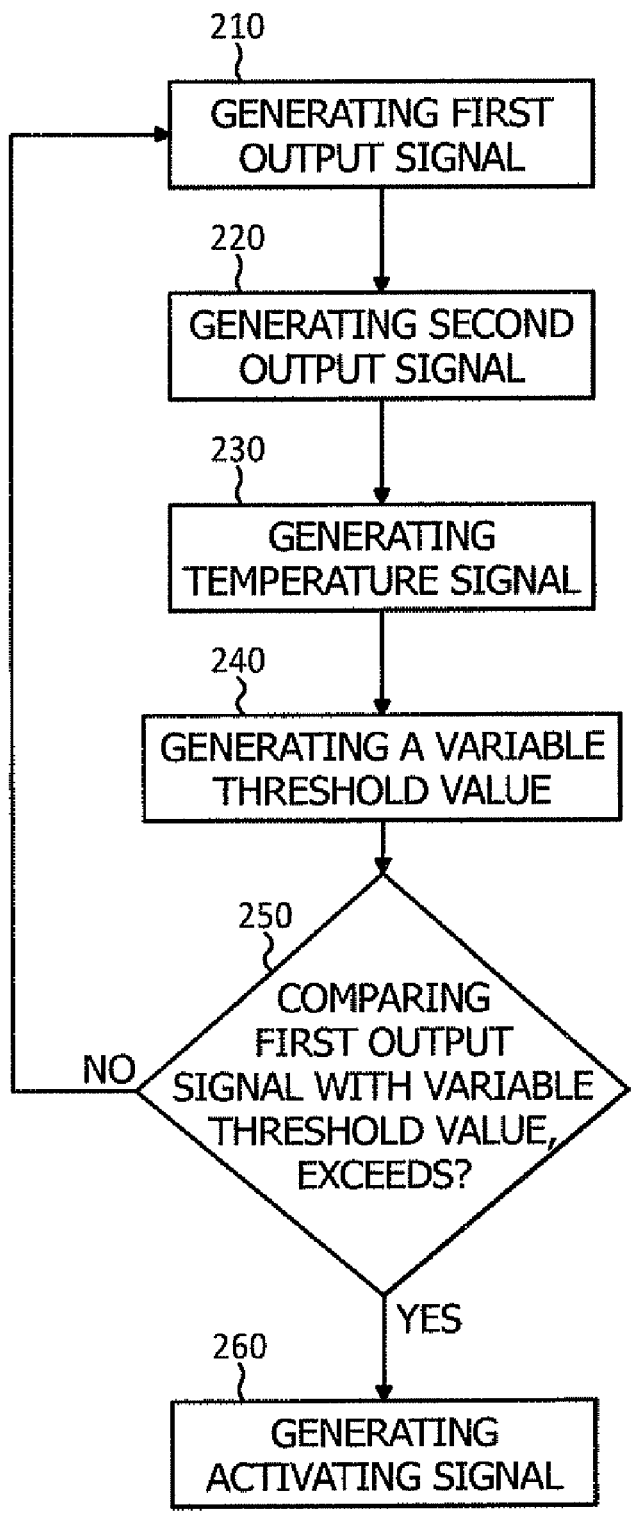
FIG. 12 is a flow chart illustrating a method for detecting the presence of an intruder in a detection zone according to one exemplary embodiment of the present invention.

FIG. 12 is a flow chart illustrating a method 200 for detecting the presence of moving object, such as an intruder, according to one exemplary embodiment of the present invention. Although the steps of the embodiment are shown and described as a series of acts, it should be recognized that the present invention is not limited by the order of acts, as some acts may occur in different orders and/or concurrent with other acts. Moreover, not all illustrated acts are required to implement the embodiment of the method according to the present invention.

At step 210, a first output signal is generated by the pyroelectric sensor 110 shown in FIG. 1, upon sensing incident light in infrared spectrum. At step 220, a second output signal is generated by the white light sensor 120 shown in FIG. 1, upon sensing incident light generally in visible spectrum. Preferably, the second output signal is indicative of the change of light intensity of the visible light within a predetermined time span, such as 5 seconds. Optionally, at step 230, a temperature signal is generated by the temperature sensor 140 shown in FIG. 1, upon sensing the ambient temperature of the detection system. At step 240, at least one variable threshold value for pyroelectric sensor 110 is generated by the processing component 140 shown in FIG. 1, based on the change of light intensity of the visible light within a predetermined time span, such as 5 seconds, and the temperature. At step 250, it is further determined by the processing component whether the first output signal exceeds the threshold value. If at step 250, the first output signal exceeds the threshold value, the method proceeds to step 260, at which the processing component generates an activating signal and transmits the signal to the alarm relay 180 and/or status indicator 190. If at step 250, the first output signal does not exceed the threshold value, no activating signal is generated and method returns to step 210. Preferably, at step 204, the variable threshold value is generated according to the above-mentioned Equation 1.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A motion detection system for detecting the presence of a moving object within a detection zone, comprising:
   a first sensor responsive to light in a first range of wavelengths in the detection zone and generating a first output signal indicative of a first detected parameter of the light in the first range;
   a second sensor responsive to light in a second range of wavelengths in the detection zone and generating a second output signal indicative of a second detected parameter of the light in the second range, wherein the second range of wavelengths is different from the first range of wavelengths; and
   a processing component for generating a variable threshold value for the first sensor based upon at least maximum and minimum output signals from the second sensor within a predetermined period of time, and for comparing the first output signal with the variable threshold value,
   wherein the processing component generates an activating signal if the first output signal exceeds the variable threshold value.

2. The motion detection system of claim 1, wherein the first sensor is a pyroelectric sensor and the second sensor is a visible light sensor.

3. The motion detection system of claim 1, wherein the first range of wavelengths comprises wavelengths in the infrared spectrum and the second range of wavelengths comprises wavelengths in the visible spectrum.

4. The motions detection system of claim 1, wherein:
the second detected parameter of the light in the second range comprises a differentiation of the intensity of the light in the second range within a predetermined time span; and
the variable threshold value for the first sensor comprises a variable threshold value generated based upon the output signal indicative of the differentiation of the intensity of the light in the second range within a predetermined time span.

5. The motion detection system of claim 1, further comprising a temperature sensor for detecting the ambient temperature of the motion detection system and generating a temperature signal indicative of the ambient temperature of the motion detection system.

6. The motion detection system of claim 5, wherein the variable threshold value for the first sensor comprises a variable threshold value for the first sensor generated based upon a second output signal indicative of a second detected parameter of the light in the second range and the temperature signal.

7. The motion detection system of claim 6, wherein:
the second detected parameter of the light in the second range comprises a differentiation of the intensity of the light in the second range within a predetermined time span; and
the variable threshold value for the first sensor comprises a variable threshold value generated based upon the second output signal indicative of the differentiation and the temperature signal.

8. The motion detection system of claim 1, further comprising an alarm generating component for generating an alarm based upon the activating signal.

9. The motion detection system of claim 1, wherein the second sensor is disposed approximately to the first sensor.

10. A method of detecting the presence of a moving object within a detection zone, comprising the steps of:
sensing light in a first range of wavelengths in the detection zone and generating a first output signal indicative of a first detected parameter of the light in the first range;
sensing light in a second range of wavelengths and generating a second output signal indicative of a second detected parameter of the light in the, second range, wherein the second range of wavelengths is different from the first range of wavelengths;
generating a variable threshold value based upon at least maximum and minimum output signals from the second sensor within a predetermined period of time; and
comparing the first output signal with the variable threshold and generating an activating signal if the first output signal exceeds the variable threshold value.

11. The method of claim 10, further comprising generating an alarm based upon the activating signal.

12. The method of claim 10, wherein sensing light in a first range of wavelengths and generating a first output signal indicative of a first detected parameter of the light in the first range comprises sensing light in the infrared spectrum and generating a first output sign indicative of a first detected parameter of the light in the infrared spectrum.

13. The method of claim 10, wherein sensing light in a second range of wavelengths and generating a second output signal indicative of a second detected parameter of the light in the second range comprises sensing light in the visible spectrum and generating a second output sign indicative of a second detected parameter of the light in the visible spectrum.

14. The method of claim 10, wherein:
sensing light in a second range of wavelengths and generating a second output signal indicative of a second detected parameter of the light in the second range comprises sensing light in a second range of wavelengths and generating a second output signal indicative of a differentiation of the intensity of the light in the second range within a predetermined time span; and
generating a variable threshold value based upon the second output signal indicative of a second detected parameter of the light in the second range comprises generating a variable threshold value based upon the second output signal indicative of the differentiation of the intensity of the light in the second range within a predetermined time span.

15. The method of claim 10, further comprising sensing the ambient temperature of the motion detection system and generating a temperature signal indicative of the ambient temperature of the motion detection system.

16. The method of claim 15, wherein generating a variable threshold value comprises generating a variable threshold value based upon the second output signal indicative of a second detected parameter of the light in the second range and the temperature signal.

17. The method of claim 16, wherein:
sensing light in a second range of wavelengths and generating a second output signal indicative of a second detected parameter of the light in the second range comprises sensing light in a second range of wavelengths and generating a second output signal indicative of a differentiation of the intensity of the light in the second range within a predetermined time span; and
generating a variable threshold value comprises generating a variable threshold value based upon the second output signal indicative of the differentiation of the intensity of the light in the second range within a predetermined time span and the temperature signal.

* * * * *